Figure 3:
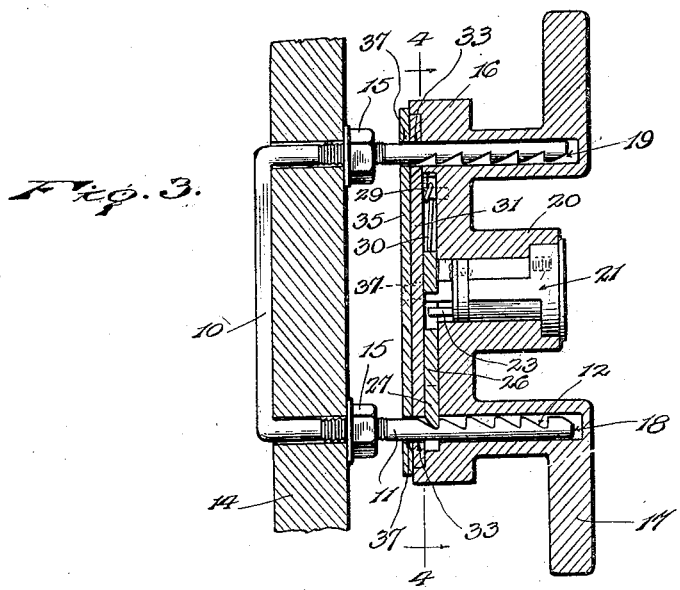

Mar. 27, 1923. 1,449,964.
L. R. ZEPKA.
THEFT SIGNAL.
FILED JULY 14, 1922. 2 SHEETS—SHEET 1.
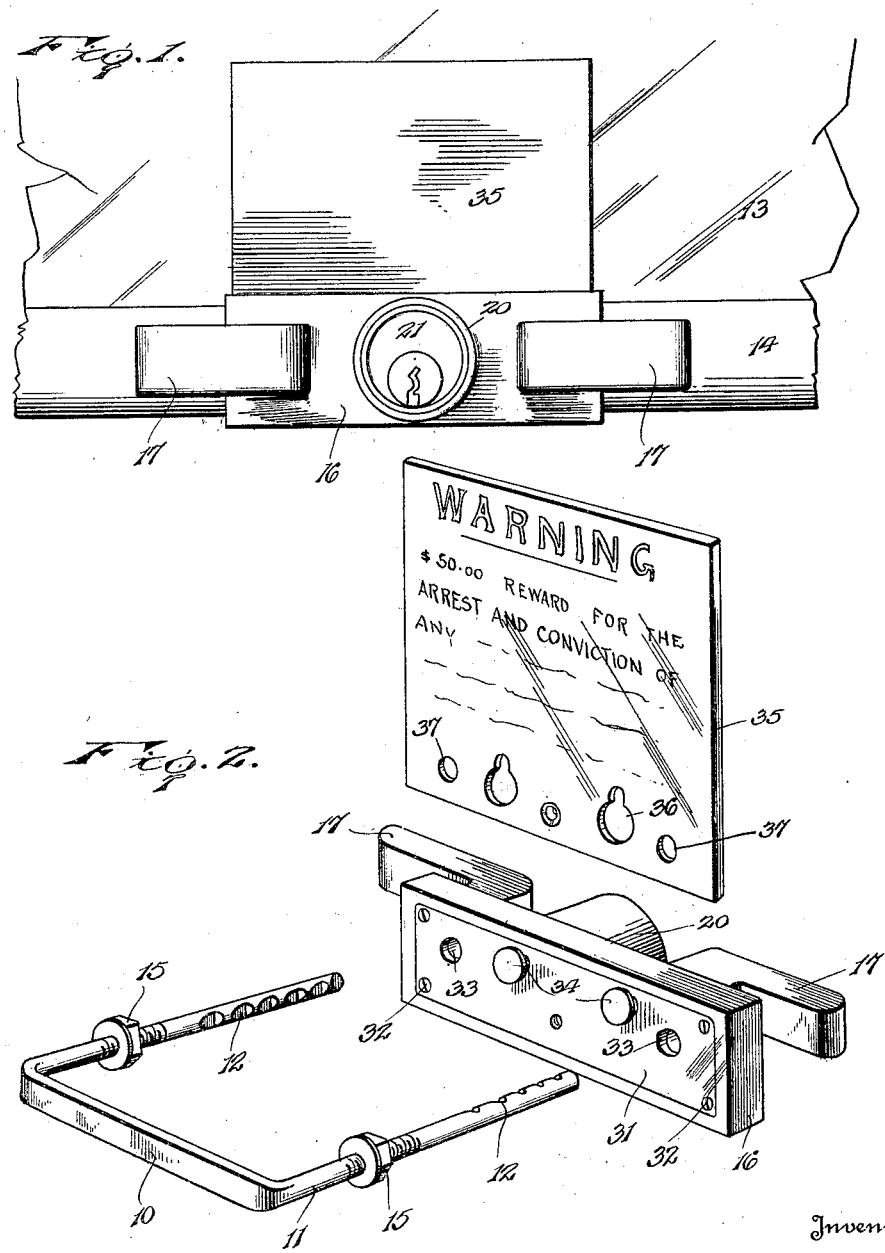
Inventor
L. R. Zepka
By Lacey & Lacey, Attorneys Patented Mar. 27, 1923.

1,449,964

UNITED STATES PATENT OFFICE.

LUDWIG R. ZEPKA, OF CLEVELAND, OHIO.

THEFT SIGNAL.

Application filed July 14, 1922. Serial No. 575,007.

*To all whom it may concern:*

Be it known that I, LUDWIG R. ZEPKA, citizen of the United States, residing at Cleveland, in the county of Cuyahoga and State of Ohio, have invented certain new and useful Improvements in Theft Signals, of which the following is a specification.

This invention relates to an improved theft signal for motor vehicles and seeks, as one of its principal objects, to provide a device of this character which may be carried by a vehicle wind shield to display a warning indicating that the driving, occupancy, or tampering with the vehicle while the owner is absent is unauthorized.

The invention has as a further object to provide a device of this character embodying a lock shackle which may be permanently attached to the wind shield, and a signal carrying lock case which may be engaged with the shackle when it is desired to display the warning signal.

And the invention has as a still further object to provide a device wherein the lock case will be equipped with handles which may be grasped for tilting the wind shield, the device being thus adapted to supplant the ordinary handle of the wind shield.

Other and incidental objects will appear hereinafter.

Figure 4:
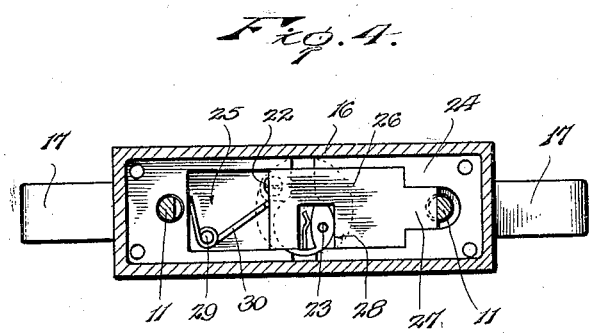
Figure 5:
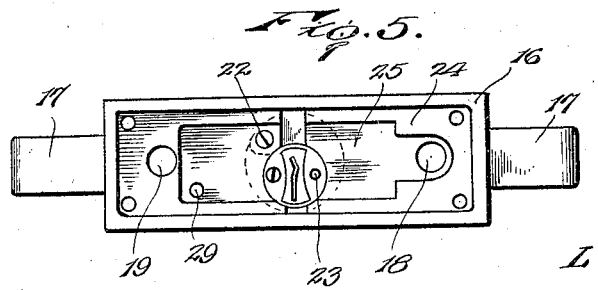

In the drawings:

Figure 1 is a rear elevation of my improved theft signal showing the device in connection with a conventional wind shield, Figure 2 is a perspective view showing the device detached, Figure 3 is a horizontal sectional view through the device, Figure 4 is a vertical sectional view on the line 4—4 of Figure 3, looking in the direction of the arrows, and Figure 5 is a detail elevation of the lock case, the closure plate of the case being removed.

In carrying the invention into effect, I employ a U-shaped lock shackle 10 having parallel arms 11 provided at their inner sides with teeth 12. This shackle is designed to be mounted upon the lower rail of a vehicle wind shield and in applying the shackle, I first remove the usual handle upon said rail of the wind shield, when the arms 11 of the shackle are inserted through the bolt openings for the handle from the forward side of said rail so that the arms will thus project, as shown in Figure 3, at the rear of the rail. In the drawings, a wind shield is conventionally illustrated at 13 and the lower rail thereof at 14. Threaded upon the arms of the shackle are nuts 15 securing the shackle in position, suitable washers being preferably interposed between the nuts and the rear face of the rail.

In conjunction with the shackle I employ an oblong lock case 16 provided near its ends with oppositely directed handles 17 in which are formed recesses 18 and 19 and rising from the case midway between said handles, is a cylindrical boss 20. Mounted in said boss is an appropriate lock 21 held by a screw 22 and projecting from the inner end of the lock cylinder is a pin 23. At its inner side, the lock case is provided with a recess 24 in the bottom wall of which is a cavity 25, it being observed, as shown in Figure 3, that the pin 23 extends into said cavity, and slidably mounted in the cavity is a catch plate 26 provided at one end with a reduced beveled tongue 27 while in the lower edge of the plate is formed a notch 28 receiving the pin 23. Rising from the bottom wall of the cavity 25 is a post 29 and mounted upon said post is a spring 30, one end of which bears against the adjacent end wall of the cavity while the other end of said spring bears against the rear end of the catch plate 26 projecting the plate forwardly to the limit of its throw, having the tongue 27 thereof intersecting the recess 18 of the lock case. Mounted in the recess 24 is a closure plate 31 lying flush with the rear face of the lock case, this plate being removably secured in position by screws or other suitable fastening devices 32, and formed in the plate are openings 33 registering with the recesses 18 and 19 of the case. Rising from the plate are headed studs 34 and mounted upon said studs is a signal plate 35 provided in its lower margin with keyhole slots 36 to removably accommodate said studs. The lower margin of the plate is further provided with openings 37 registering with the openings 33 of the closure plate 31 and extending through the signal plate is a screw or other suitable fastening device 38 threaded into the closure plate for limiting the signal plate against upward movement. Thus, the signal plate while being detachably mounted upon the lock case, will normally be held firmly thereon to upstand at the inner side of the lock case and suitably imposed upon the forward side of said plate is a warning indicating that the starting, driving, or tampering with the vehicle when the owner is absent is unauthorized.

To display the signal plate 35 when the owner or driver leaves the vehicle, the lock case 16 is, as shown in Figure 3, applied to the shackle 10, the arms 11 of said shackle being freely received through the registering openings 33 and 37 of the closure plate 31 and signal plate 35 to project into the recesses 18 and 19 in the handles of the lock case. As the lock case is pushed inwardly upon said arms, the tongue 27 of the catch plate 26 will, of course, ride over the teeth 12 of the adjacent arm of the shackle so that the lock case may be readily applied but will automatically engage said arm for holding the case against retraction and consequently lock the case upon the shackle. Thus, the lock case will, as brought out in Figure 1, be secured upon the shackle to support the signal plate 35 upstanding at the rear of the wind shield so that the warning upon said plate may be readily viewed through the wind shield and since the arms 11 of the shackle extend through the signal plate, said plate will be locked against individual displacement to permit access to the catch plate 26. Accordingly, the lock case as well as the signal plate cannot be detached from the shackle except by operation of the lock 21. Upon rotation of the lock cylinder by a proper key, the pin 23 will be moved into engagement with the rear wall of the notch 28 for retracting the catch plate when the lock case may be freely displaced. Thus, when it is not desired to display the warning signal, the lock case may be displaced from the shackle, turned end for end, and again applied thereto, when the catch plate 26 will engage the other of the arms of the shackle for securing the lock case thereon. In this position of the lock case, the signal plate 35 will, of course, depend therefrom out of view. I accordingly provide a device wherein the shackle is adapted to support the lock case to sustain the signal plate in both active and inactive position and since the signal plate, when presented downwardly, may strike or interfere with some of the instruments upon the instrument board of the vehicle, said plate is made detachable so that in such instance, the signal plate may, by dispensing with the screw 37, be removed from the lock case when desired. The handles 17 are provided so that when the lock case is applied to the shackle, said handles may be grasped for tilting the lower section of the wind shield. Further, these handles will, of course, also facilitate the manipulation of the lock case when applying the lock case to the shackle or removing said case therefrom.

Having thus described the invention, what is claimed as new is:

1. The combination with a motor vehicle of a lock including complemental key controlled separable parts one engaged with the vehicle locked against removal by the other of said parts, and a signal normally displayed by one of the parts.

2. The combination with a motor vehicle wind shield, of a lock including complemental key controlled separable parts one engaged with the wind shield locked against removal by the other of said parts, and a signal plate locked upon one of the parts when said parts are engaged with each other.

3. The combination with a motor vehicle wind shield, of a lock including complemental key controlled separable parts one engaged with the wind shield locked against removal by the other of said parts, and a signal plate mounted upon said second mentioned part.

4. The combination with a motor vehicle wind shield, of a lock including complemental key controlled separable parts one engaged with the wind shield locked against removal by the other of said parts, and a signal plate mounted upon said second mentioned part locked against removal thereby and engaged by said first mentioned part.

5. The combination with a motor vehicle wind shield, of a lock including complemental key controlled separable parts one engaged with the wind shield locked against removal by the other of said parts, and a signal normally displayed by one of the parts, said last mentioned part being reversible upon said first mentioned part for disposing the signal in inactive position.

6. The combination with a motor vehicle wind shield, of a lock including a shackle mounted upon the wind shield, a lock case detachably engaging the shackle securing the shackle against displacement, and a signal plate mounted upon the case normally supported thereby for display.

7. The combination with a motor vehicle wind shield, of a lock including a shackle mounted upon the wind shield, a lock case detachably engaging the shackle securing the shackle against displacement, and a signal plate mounted upon the case normally supported thereby for display, the lock case being reversible end for end upon the shackle to dispose the signal plate in inactive position.

8. A theft signal for motor vehicles including a shackle having spaced arms, a lock case recessed to accommodate said arms, a key controlled catch plate carried by the case to engage one of the arms securing the lock case against removal, and a signal plate mounted upon the lock case.

9. A theft signal for motor vehicles including a shackle having spaced arms, a lock case recessed to accommodate said arms, a key controlled catch plate carried by the case to engage one of the arms securing the lock case against removal, and a signal plate detachably mounted upon the lock case and receiving the arms of the shackle therethrough.

In testimony whereof I affix my signature.

LUDWIG R. ZEPKA. [L. S.]